United States Patent [19]

Tagawa et al.

[11] Patent Number: 5,098,943

[45] Date of Patent: Mar. 24, 1992

[54] WATER REPELLENT AND WATER REPELLENT GYPSUM COMPOSITION

[75] Inventors: Toru Tagawa; Takao Tadenuma, both of Yokohama; Yasoji Ozawa, Machida, all of Japan

[73] Assignee: Mitsubishi Kasei Corporation, Tokyo, Japan

[21] Appl. No.: 700,317

[22] Filed: May 9, 1991

Related U.S. Application Data

[63] Continuation of Ser. No. 470,312, Jan. 25, 1990, abandoned.

[30] Foreign Application Priority Data

Feb. 22, 1989 [JP] Japan .................................. 1-42164

[51] Int. Cl.$^5$ .................................. C08K 3/30
[52] U.S. Cl. .................................. 524/423; 524/489; 524/503; 524/517; 524/277; 524/77; 524/549
[58] Field of Search ............... 524/423, 503, 277, 489, 524/517

[56] References Cited

U.S. PATENT DOCUMENTS

| | | | |
|---|---|---|---|
| 4,042,409 | 8/1977 | Terada et al. | 524/423 X |
| 4,148,781 | 4/1979 | Narukawa et al. | 524/423 |
| 4,748,196 | 5/1988 | Kuroda et al. | 524/503 X |

OTHER PUBLICATIONS

Patent Abstracts of Japan, unexamined applications, C section, vol. 3, No. 7, Jan. 24, 1979, The Patent Office Japanese Government, p. 143 C 34, Kokai-No. 53-131 979 (Mitsubishi).

Patent Abstracts of Japan, unexamined applications, C section, vol. 4, No. 151, Oct. 23, 1980, The Patent Office Japanese Government, p. 20 C 28, Kokai-No. 55-94 983 (Kindai).

*Primary Examiner*—Joseph L. Schofer
*Assistant Examiner*—J. M. Reddick
*Attorney, Agent, or Firm*—Oblon, Spivak, McClelland, Maier & Neustadt

[57] ABSTRACT

A water repellent having the following components (A), (B), (C) and (D) emulsified in water:

(A) a wax having a melting point of from 40° to 90° C.;
(B) a styrene-maleic anydride copolymer;
(C) a water-soluble alkaline compound; and
(D) a polyvinyl alcohol having a saponification degree of at least 85 mol %.

12 Claims, No Drawings

WATER REPELLENT AND WATER REPELLENT GYPSUM COMPOSITION

This application is a continuation of application Ser. No. 07/470,312, filed on Jan. 25, 1990, now abandoned.

The present invention relates to a water repellent having excellent properties which have not been seen before. More particularly, it relates to a water repellent having improved water resistance and operation efficiency, and a water repellent gypsum composition employing it.

Products employing gypsum, such as a gypsum board and a gypsum plaster, have remarkable features such as fire retardancy, sound shielding properties, strength and low production costs, which are attributable to the nature of gypsum. Nevertheless, such products have a drawback in the water resistance, and their application has been rather limited because of this drawback. Various methods have been proposed to complement such a drawback of gypsum. For example, there have been proposed a method wherein asphalt or paraffin is added to gypsum in the form of powder, followed by molding and then by melting, a method wherein asphalt and paraffin are added to gypsum in an emulsified state, and a method wherein a silicon compound or a synthetic resin emulsion is added to gypsum. However, by such methods, it has been difficult to obtain a product having satisfactory water repellency.

In order to overcome the above drawback, it has been proposed to use as a water repellency-imparting agent paraffin and oxidized paraffin (Japanese Examined Patent Publication No. 50906/1980), wax and carboxyl group-containing wax (Japanese Unexamined Patent Publication No. 37423/1980), paraffin and an unsaturated fatty acid adduct of an olefin (Japanese Unexamined Patent Publication No. 14932/1985), wax and a styrene-maleic anhydride copolymer (Japanese Unexamined Patent Publication No. 56178/1980), or an alkyl or alkenyl succinate and a water-soluble aluminum compound (Japanese Unexamined Patent Publication No. 113650/1985).

Although the water repellency of the water repellents may be satisfied by these methods, it is still required to add a surfactant for foam stabilization during the production of a shaped product such as a gypsum board. Accordingly, there has been a drawback that the water repellency imparted will thereby be impaired.

The present inventors have conducted extensive researches for a method to solve such problems, and have found that by using a styrene-maleic anhydride copolymer and a specific polyvinyl alcohol in combination for the emulsification of a wax, the foam stability can be improved without impairing the water repellency or the fluidity of the gypsum slurry. The present invention has been accomplished on the basis of this discovery.

The present invention provides a water repellent having the following components (A), (B), (C) and (D) emulsified in water:

(A) a wax having a melting point of from 40° to 90° C.;
(B) a styrene-maleic anhydride copolymer;
(C) a water-soluble alkaline compound; and
(D) a polyvinyl alcohol having a saponification degree of at least 85 mol %.

The present invention also provides a water repellent gypsum composition comprising such a water repellent and gypsum.

Now, the present invention will be described in detail with reference to the preferred embodiments.

The wax having a melting point of from 40° to 90° C. as component (A) of the water repellent of the present invention, means a paraffin-type or olefin-type hydrocarbon. Specifically, it includes, for example, paraffin wax, montan wax and a polyolefin wax having a low melting point.

If the melting point of the wax is lower than 40° C., a deterioration in the quality of the product is likely to occur during summer, and if it exceeds 90° C., it tends to be difficult to obtain a product having good water repellency.

The styrene-maleic anhydride copolymer (B) is obtained by the copolymerization of styrene and maleic anhydride, and its molecular weight is usually from 800 to 100,000, preferably from 1,000 to 50,000.

Such a copolymer may be used also in the form of a derivative such as a partial ester of an organic monohydroxy compound. Partial esterification may be conducted after the reaction of styrene with maleic anhydride. Otherwise, it may be conducted by the reaction of a partial ester of maleic anhydride with styrene. The molar ratio of styrene to maleic anhydride or its partial ester is preferably within a range of from 1:1 to 1:5. If the molar ratio is outside this range, the stability of the emulsion or the water repellency of the gypsum composition tends to be impaired, such being undesirable.

The organic monohydroxy compound to be used for forming the partial ester, may be an alcohol such as methanol, ethanol, isopropanol, butanol or 2-ethylhexanol, or a cellosolve such as butyl cellosolve or ethyl cellosolve. The organic monohydroxy compound is used in an amount of not higher than 1 mol per mol of maleic anhydride.

According to the present invention, the water repellency can be improved by incorporating a hydrocarbon resin (E) to the above-mentioned wax (A) and styrene-maleic anhydride copolymer (B). Such a hydrocarbon resin may be petroleum resin such as a cumarone-indene resin having a molecular weight of from 500 to 3,000 obtainable by polymerizing a $C_9$ aromatic hydrocarbon or $C_5$ aliphatic hydrocarbon fraction obtained from the refinery of a petroleum or from a process of a petroleum chemical industry, by means of a Friedel Crafts catalyst, a terpene resin having a molecular weight of from 500 to 3,000 obtainable from turpentine oil, rosin, an oligomer of ethylene, propylene, butene, isobutylene or styrene having a molecular weight of from 500 to 3,000 and a melting point of at least 95° C., or asphalt. In the present invention, "the hydrocarbon resin" includes petroleum resins as typical examples, as mentioned above, and may contain, in addition to carbon and hydrogen, some other atoms such as oxygen.

The hydrocarbon resin is used in an amount by weight ratio of the wax:the hydrocarbon resin of from 100:0 to 30:70. If the hydrocarbon resin is used too much, the water repellency of the wax is likely to be impaired, and such will also increase the cost.

Specific examples of the water-soluble alkaline compound (C) to be used for emulsification, include alkali metal hydroxides such as lithium hydroxide, sodium hydroxide and potassium hydroxide; alkali metal carbonates such as sodium carbonate and potassium carbonate; ammonia; ammonium hydroxide; amines such as dimethylamine, trimethylamine and triethylamine; and ethanolamines such as triethanolamine, diethanolamine, dimethylethanolamine and methyldiethanolamine. Such an alkaline compound is added in an amount of from 0.3 to 3 times the amount required for neutralizing the styrene-maleic anhydride copolymer. If the amount is outside this range, the stability of the emulsion is likely to be impaired, such being undesirable.

The weight ratio of the wax or a mixture of the wax and the hydrocarbon resin to the styrene-maleic anhydride copolymer is selected within a range of from 1:0.01 to 1:0.7, preferably from 1:0.02 to 1:0.4.

Further, the present invention has a feature that by incorporating the specific polyvinyl alcohol (D), the foam stability and the stability of the emulsion are improved without impairing the water repellency of the emulsion as a water repellent. As such a specific polyvinyl alcohol, the one wherein at least 85 mol %, particularly from 86 to 99.8 mol %, of polyvinyl acetate has been saponified, is preferred, and the one having a viscosity of a 4% aqueous solution at 20° C. being from 1 to 8 centipoise, particularly from 3 to 30 centipoise, is preferred. Usually, the weight ratio of the total amount of the wax (or the wax and the hydrocarbon resin) and the styrene-maleic anhydride copolymer to the polyvinyl alcohol is within a range of from 1:0.01 to 1:1. The polyvinyl alcohol may be added after formation of the emulsion or during the emulsification.

Further, a water-soluble polymer such as polyacrylamide, methyl cellulose, carboxymethyl cellulose, hydroxyethyl cellulose or hydroxypropyl cellulose, may be incorporated, as the case requires.

As a method for preparing an emulsion of the water repellent component in the present invention, phase reversal emulsification or mechanical emulsification may be mentioned. These methods ma be used alone or in combination. The mechanical emulsification may be conducted by a homomixer, a valvehomogenizer, a colloid mill or a supersonic method. Any method may be used so long as a uniform emulsion can be prepared.

The water repellent of the present invention is made of an emulsion prepared as described above and useful for fibers, papers, wood materials or synthetic wood materials (particle boards). By virtue of its excellent foam stability, it is useful particularly as a water repellent gypsum composition. As gypsum, β-gypsum and α-hemihydrate and 2-type anhydrous gypsum which are commonly used for industrial purposes, may be used in the present invention. Further, light weight fillers such as pearlite and vermiculite, various foaming agents, water-reducing agents for gypsum, agents for controlling the coagulation rate of gypsum, reinforcing fibers, etc. may be incorporated as the case requires.

To prepare a gypsum composition according to the present invention, the water repellent emulsion prepared as described above is added to an aqueous slurry containing gypsum, and after the hardening, the hardened product is dried as the case requires. The above-mentioned emulsion in the present invention is added usually in an amount such that the solid content in the emulsion will be from 0.5 to 20 parts by weight, preferably from 0.7 to 10 parts by weight, per 100 parts by weight of calcined plaster. If the solid content is less than the above range, no adequate effects will be obtained, and if it exceeds the above range, the fire retardancy and the economical advantage as the feature of the gypsum composition will be lost, such being undesirable.

Now, the present invention will be described in further detail with reference to Examples, Comparative Examples and Preparation Examples. However, it should be understood that the present invention is by no means restricted by such specific Examples. In the following Examples, "parts" and "%" mean "parts by weight" and "% by weight", respectively.

PREPARATION OF WATER REPELLENT

Preparation Example 1

Sixty parts of paraffin wax having a melting point of 62.8° C. and 32 parts of petroleum resin having a melting point of 97° C. and a bromine value of 31.2, were melted at 120° C. Then, the temperature of the system was lowered to 98° C., and 4 parts of a styrene-maleic anhydride copolymer (acid value: 360, molecular weight: 1,800), 122 parts of warm water of 98° C., 1.5 parts of potassium hydroxide and 4 parts by a solid content of a polyvinyl alcohol having a saponification degree of 88 mol % and a viscosity of 5 centipoise in a 4% aqueous solution at 25° C., were added thereto, and the mixture was emulsified by a homomixer. Then, the emulsion was further subjected to a piston-type high pressure homogenizer under a pressure of 250 kg/cm² for homogenization. Then, the homogenized mixture was cooled to obtain an emulsion A having a solid content of 45%.

Preparation Example 2

Six parts of paraffin wax having a melting point of 62.8° C. and 19 parts of petroleum resin having a melting point of 97° C. and a bromine value of 31.2, were melted at 120° C. Then, the temperature of the system was lowered, and 2.5 parts of a styrene-maleic anhydride copolymer (acid value: 360, molecular weight: 1,800), 122 parts of warm water of 98° C., 0.5 part of potassium hydroxide and 2.5 parts by a solid content of a polyvinyl alcohol having a saponification degree of 88 mol % and a viscosity of 5 centipoise in a 4% aqueous solution at 25° C., were added thereto, and the mixture was treated in the same manner as in Preparation Example 1 to obtain an emulsion B having a solid content of 45%.

Preparation Example 3

An emulsion C having a solid content of 45% was prepared in the same manner as in Preparation Example 2 except that in Preparation Example 2, a polyvinyl alcohol having a saponification degree of 98 mol % and a viscosity of 5 centipoise in a 4% aqueous solution at 25° C. was used in an amount of 2.5 parts.

Preparation Example 4

An emulsion C having a solid content of 45% was prepared in the same manner as in Preparation Example 2 except that in Preparation Example 2, 19 parts of straight asphalt having a softening point of 49° C. and a needle penetration degree of from 60 to 80 was used instead of the petroleum resin and no polyvinyl alcohol was added. Then, to this emulsion, a polyvinyl alcohol having a saponification degree of 98 mol % and a viscosity of 5 centipoise in a 4% aqueous solution at 25° C. was added in an amount of 50 parts as the solid content, to obtain an emulsion D having a solid content of 32%.

Comparative Preparation Example 1

Sixty parts of paraffin wax having a melting point of 62.8° C. and 32 parts of petroleum resin having a melting point of 97° C. and a bromine value of 31.2, were melted at 120° C. Then, the temperature of the system was lowered to 98° C., and 8 parts of a styrene-maleic anhydride copolymer (acid value: 360, molecular weight: 1,800), 122 parts of warm water of 98° C. and 2.9 parts of potassium hydroxide were added thereto, and the mixture was treated in the same manner as in Preparation Example 1 to obtain an emulsion a having a solid content of 45%.

Comparative Preparation Example 2

Seventy six parts of paraffin wax having a melting point of 62.8° C. and 19 parts of straight asphalt having a softening point of 49° C. and a needle penetration degree of from 60 to 80, were melted at 120° C. Then, the temperature of the system was lowered to 98° C., and 5 parts of a styrene-maleic anhydride copolymer (acid value: 360, molecular weight: 1,800), 122 parts of warm water of 98° C. and 1.8 parts of potassium hydroxide were added thereto, and the mixture was treated in the same manner as in Preparation Example 1 to obtain an emulsion b having a solid content of 45%.

Comparative Preparation Example 3

An emulsion c having a solid content of 45% was prepared in the same manner as in Preparation Example 2 except that in Preparation Example 2, 2.5 parts by a solid content of a polyvinyl alcohol (10% aqueous solution) having a saponification degree 80 mol % and a viscosity of 5 centipoise in a 4% aqueous solution at 25° C. was used instead of the polyvinyl alcohol having a saponification degree of 88 mol % and a viscosity of 5 centipoise in a 4% aqueous solution at 25° C.

PREPARATION OF GYPSUM COMPOSITION

Application Example 1

The emulsion obtained in each of Preparation Examples 1 to 4 and Comparative Preparation Examples 1 to 3, was added to β-hemihydrate gypsum (Grade A of Sakura-Jirushi, manufactured by Yoshino Gypsum Co., Ltd.) in an amount by a solid content of 1.5 parts per 100 parts of gypsum. Further, 0.015 to 0.030 part of sodium lauryl sulfate as a foaming agent and 80 parts of water were added thereto and mixed.

The obtained slurry was introduced into a measuring cylinder, and the volume was measured and represented in Table 1 as the foam stability.

TABLE 1

| Emulsion | Foam stability (ml) Amount of the foaming agent (parts) | | | |
|---|---|---|---|---|
| | 0.15 | 0.020 | 0.025 | 0.30 |
| A | 860 | 890 | 935 | 950 |
| B | 835 | 860 | 915 | 925 |
| C | 810 | 855 | 880 | 900 |
| D | 815 | 855 | 875 | 900 |
| a | 800 | 820 | 870 | 890 |
| b | 780 | 820 | 855 | 895 |
| c | 795 | 860 | 880 | 895 |

Application Example 2

The emulsion obtained in each of Preparation Examples 1 to 4 and Comparative Preparation Examples 1 to 3 was added to β-hemihydrate gypsum (Grade A of Sakura-Jirushi, manufactured by Yoshino Gypsum Co., Ltd.) in an amount by a solid content of 1.0 part per 100 parts of gypsum. Further, 2 parts of dihydrate gypsum as a coagulation accelerating agent, 0.1 part of potassium sulfate, 80 parts of water and a foaming agent in an amount to bring the specific gravity of the resulting gypsum board to a level of form 0.75 to 0.80, were added thereto. The mixture was cast between a pair of sheets for preparing a gypsum board, to obtain a gypsum board, which was then dried at 70° C. for 2.5 hours.

The gypsum board thus obtained was immersed in water of 20° C.±1° C. at a position 2 mm below the water surface for 2 hours, whereupon the water absorption (Aw) was obtained by the following equation. The results are shown in Table 2.

$$Aw (\%) = \frac{(\text{Weight after immersion} - \text{Weight before immersion})}{\text{Weight before immersion}} \times 100$$

TABLE 2

| Emulsion | Water absorption (Aw) | Specific gravity of the board | Amount of the foaming agent (parts) |
|---|---|---|---|
| A | 6.5 | 0.75 | 0.016 |
| B | 7.9 | 0.76 | 0.016 |
| C | 7.0 | 0.76 | 0.016 |
| D | 7.4 | 0.75 | 0.016 |
| a | 8.8 | 0.75 | 0.020 |
| b | 20.7 | 0.74 | 0.020 |
| c | 10.0 | 0.74 | 0.020 |

With the water repellent of the present invention, it is possible to obtain a predetermined specific gravity with a smaller amount of the foaming agent than required when the conventional water repellents are used. Therefore, the product has higher water resistance than the conventional water repellents, and it is thereby possible to produce an excellent gypsum board.

We claim:

1. A water repellent having the following components (A), (B), (C), and (D), emulsified in water;
    (A) a wax having a melting point of from 40 to 90° C.;
    (B) a copolymer consisting essentially of styrene and maleic anhydride;
    (C) a water-soluble alkaline compound; and
    (D) a polyvinyl alcohol having a saponification degree of at least 85 mol %.

2. A water repellent having the following components (A), (B), (C), and (C), emulsified in water:
    (A) a wax having a melting point of from 40° to 90° C.;
    (B) a copolymer consisting essentially of styrene and maleic anhydride;
    (C) a water-soluble alkaline compound;
    (D) a polyvinyl alcohol having a saponification degree of at least 85 mol %; and
    (E) a hydrocarbon resin.

3. The water repellent according to claim 1 or 2, wherein the sytrene-maleic anhydride copolymer (B) has a molecular weight of from 800 to 100,000.

4. The water repellent according to claim 1 or 2, wherein in the copolymer of styrene and maleic anhydride (B), the molar ratio of styrene to maleic anhydride is from 1:1 to 1:5.

5. The water repellent according to claim 2, the hydrocarbon resin (E) is in an amount by weight ratio of the wax (A):the hydrocarbon resin (E) of from 100:0 to 30:70.

6. The water repellent according to claim 1 or 2, wherein the weight ratio of the wax (A) or a mixture of the wax (A) and the hydrocarbon resin (E), to the styrene-maleic anhydride copolymer (B), is from 1:0.01 to 1:0.7.

7. The water repellent according to claim 1 or 2, wherein the weight ratio of the total amount of the wax (A) or the wax (A) and the hydrocarbon resin (E), and the styrene-maleic anhydride copolymer (B), to the polyvinyl alcohol (D), is from 1:0.01 to 1:1.

8. A water repellent composition comprising:
  (A) a wax having a melting point of from 40° to 90° C.;
  (B) a copolymer consisting essentially of styrene and maleic anhydride;
  (C) a water-soluble alkaline compound; and
  (D) a polyvinyl alcohol having a saponification degree of at least 85 mol %.

9. A water repellent composition comprising:
  (A) a wax having a melting point of from 40° to 90° C.;
  (B) a copolymer consisting essentially of styrene and maleic anhydride;
  (C) a water-soluble alkaline compound;
  (D) a polyvinyl alcohol having a saponification degree of at least 85 mol %; and
  (E) a hydrocarbon resin.

10. A water repellent gypsum composition comprising a water repellent having the following components (A), (B), (C) and (D) emulsified in water:
  (A) a wax having a melting point of form 40° to 90° C.;
  (B) a copolymer consisting essentially of styrene and maleic anhydride;
  (C) a water-soluble alkaline compound; and
  (D) a polyvinyl alcohol having a saponificaton degree of at least 85 mol %;
  and gypsum.

11. A water repellent gypsum composition comprising a water repellent having the following components (A), (B), (C), (D) and (E) emulsified in water:
  (A) a wax having a melting point of from 40° to 90° C.;
  (B) a copolymer consisting essentially of styrene and maleic anhydride;
  (C) a water-soluble alkaline compound;
  (D) a polyvinyl alcohol having a saponification degree of at least 85 mol %; and
  (E) a hydrocarbon resin, and gypsum.

12. A gypsum board made of water repellent gypsum composition according to claim 8 or 9.

* * * * *